US012031689B2

(12) United States Patent
Jin et al.

(10) Patent No.: US 12,031,689 B2
(45) Date of Patent: Jul. 9, 2024

(54) TUBULAR DEVICE FOR FITTING TO A TUBULAR LIGHT FITTING

(71) Applicant: SIGNIFY HOLDING B.V., Eindhoven (NL)

(72) Inventors: Gaoxian Jin, Eindhoven (NL); Zhaoting Li, Eindhoven (NL); Haimin Tao, Eindhoven (NL); Raimundo De Heer Galisteo, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/922,359

(22) PCT Filed: Apr. 29, 2021

(86) PCT No.: PCT/EP2021/061306
§ 371 (c)(1),
(2) Date: Oct. 29, 2022

(87) PCT Pub. No.: WO2021/228571
PCT Pub. Date: Nov. 18, 2021

(65) Prior Publication Data

US 2023/0175654 A1 Jun. 8, 2023

(30) Foreign Application Priority Data

May 11, 2020 (WO) ................ PCT/CN2020/089647
Nov. 6, 2020 (EP) .................................... 20179439

(51) Int. Cl.
*F21K 9/278* (2016.01)
*F21K 9/272* (2016.01)
*H05B 45/3578* (2020.01)
*F21Y 115/10* (2016.01)

(52) U.S. Cl.
CPC .............. *F21K 9/278* (2016.08); *F21K 9/272* (2016.08); *H05B 45/3578* (2020.01); *F21Y 2115/10* (2016.08)

(58) Field of Classification Search
None
See application file for complete search history.

(56) References Cited

U.S. PATENT DOCUMENTS

| | | | |
|---|---|---|---|
| 10,349,477 B2 | 7/2019 | Storm et al. | |
| 2013/0127327 A1 | 5/2013 | Heil et al. | |
| 2015/0061520 A1 | 3/2015 | Tao et al. | |
| 2016/0227622 A1 | 8/2016 | Ackermann et al. | |
| 2018/0279430 A1* | 9/2018 | Storm | H05B 45/3578 |
| 2019/0116643 A1* | 4/2019 | Tao | F21K 9/27 |
| 2019/0335561 A1* | 10/2019 | Wu | H05B 45/46 |

FOREIGN PATENT DOCUMENTS

| | | |
|---|---|---|
| JP | 2015515725 A | 5/2015 |
| JP | 2017520097 A | 7/2017 |
| WO | 2019141613 A1 | 7/2019 |

* cited by examiner

*Primary Examiner* — Anh Q Tran

(57) ABSTRACT

A lamp comprises an input for connection to a high frequency ballast for gas discharge lamps. A power supply unit obtains power from a LED on voltage of the LED of the lamp, and the power supply unit powers an isolation switch at the input. During a preheat stage of the ballast, the power supply unit does not close the isolation switch, but the isolation switch is closed when the high frequency ballast is in a later state, i.e. the ignition phase.

15 Claims, 6 Drawing Sheets

TUBULAR DEVICE FOR FITTING TO A TUBULAR LIGHT FITTING

CROSS-REFERENCE TO PRIOR APPLICATIONS

This application is the U.S. National Phase application under 35 U.S.C. § 371 of International Application No. PCT/EP2021/061306, filed on Apr. 29, 2021, which claims the benefits of Patent Application No. 20179439.3, filed on Jun. 11, 2020 and Chinese Patent Application No. PCT/CN2020/089647 filed on May 11, 2020. These applications are hereby incorporated by reference herein.

FIELD OF THE INVENTION

This invention relates to tubular light fittings, and in particular to the tubular lighting devices which are received in such fittings.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with electronic ballasts for fluorescent light tubes. The ballast circuit is external of the light tube, and in the case of a magnetic ballast comprises a ballast (inductor) and a starter circuit. The ballast, starter circuit and the two pairs of connection pins from a closed circuit. In a conventional fluorescent light tube, a heating filament between the connection pins of each pair completes the circuit. Electronic ballasts do not require a separate starter.

There are now tubular LED ("TLED") solid state lamps which can be used as a direct replacement for traditional fluorescent light tubes. In this way, the advantages of solid state lighting can be obtained without the expense of changing existing light fittings.

FIG. 1 shows one example of a basic known tubular solid state lamp 10, comprising a tubular housing 12 having an end cap 14 at each end (only one is shown). FIG. 1 shows a non-circular tube simply to illustrate that tubular LEDs are not limited to the circular profiles of conventional fluorescent tubes, but of course circular tubular LEDs are equally well known. The end cap 14 carries external connectors 16 in the form of two pins offset to each side from a central axis of the end cap 14, parallel to an elongate axis 15 of the tubular housing 12. The end cap 14 connects electrically to the internal driver board and the circuit board which mounts the solid state lighting elements, for example LEDs, inside the tubular housing 12.

FIG. 2 shows the basic circuit of a standard fluorescent light tube luminaire. It comprises a glow starter 17, ballast 18 and the mains AC source 19. Together with filament wires bridging the pairs of contact pins at each end of the tube 10, a closed circuit is formed. A basic electromagnetic (EM) ballast such as shown in FIG. 2 may operate at mains frequency, whereas an electronic ballast has electronic components to operate at a high frequency, such as 20 kHz.

FIG. 2 illustrates how it is safe to touch the non-connected end of the tube for a fluorescent light tube. A conventional fluorescent light tube can be inserted into such a live mains fixture without any danger because the connection pins on either side of the lamp are electrically insulated from each other by the glass tube of the lamp and the gas inside it. An electrical contact between the two ends of the lamp is only established if the gas inside it is ignited and this is only possible after both ends of the lamp have been inserted into the luminaire.

Taking the lamp out of the luminaire will immediately stop both the current flowing through it and the gas discharge in it and thus immediately re-establish electrical insulation between both ends of the lamp.

However, inserting a TLED lamp into a luminaire is potentially dangerous since it is possible to touch the connection pins on one end of the lamp whilst the other end of the lamp is already inserted and in contact with a hazardous voltage.

The reason is that a typical TLED retrofit lamp contains LED PCBs and LED driver PCBs which offer little electrical insulation between the connection pins on both ends of the TLED. It may therefore be dangerous to insert such a TLED into a live mains fixture because there is a conductive path between the two ends of the tube.

Various pin safety measures have been proposed to overcome this safety issue. These pin safety measures usually interrupt the relatively low electrical connection/impedance between both ends of the TLED by at least one switch that is only closed when both ends of the TLED are inserted into the luminaire.

Both electrical and mechanical pin safety mechanisms are known. This invention relates to electrical pin safety solutions.

In one known electrical pin safety solution, power is only taken from a first side of the tube and the other side is isolated from the first, and is arranged as a short between the two pin connections on that other side. The glow starter 17 (FIG. 2) has to be replaced by a dummy starter with a bridging wire or a fuse inside, so that the loop for the current is closed. This method has its limitations since it only works with lighting fixtures which contain a starter (FIG. 2). For example, for electronic ballast fixtures there are no starters in the circuit and therefore the dummy starter method does not work. For electronic ballast fixtures, and for some other types of ballast, other pin safety solutions are required.

For example, in some other electrical pin safety solutions, an electromagnetic relay is closed when both ends of the TLED are inserted into the lamp holders in the luminaire. The relay remains open when only one end is inserted. Insertion of the TLED into the luminaire is detected and the electromagnetic relay is closed using currents and voltages originating from the electronic ballast. An advantage of the relay pin safety solution is that it is fool-proof and maintains the look and feel of a normal lamp.

The control of a relay, in particular the closing of a relay, requires a continuous electrical power supply. Currently, the use of an electromagnetic rely requires a complex circuit of discrete components, which is hard to place in the limited PCB space of the TLED, especially for T5 tubes. Low drop out, LDO, circuits may be used as the power supply for the relay, but the circuit efficiency is poor and the circuit may create an open circuit if the input voltage is too high giving compatibility performance issues. Some other solutions directly use the power at the input to drive the relay, but the power at the input is normally high a frequency AC signal and is very unstable.

Thus, there is a need for an improved electrical pin safety solution which is compact and low cost, and compatible with different types of electronic (high frequency) ballast.

US20180279430A1 and US20160227622A1 disclose tubular LED lamp with safety relay, wherein the power supply of the relay is more or less directly from the ballast's high frequency output.

SUMMARY OF THE INVENTION

The invention is defined by the claims.

It is a concept of the invention to provide an isolation switch at the input to a lamp such as a tubular LED lamp, and to keep the isolation switch open during a preheat stage of a high frequency ballast for a gas discharge lamp. This provides pin safety in that the isolation switch is only closed after the preheat stage, and the lamp must then be correctly connected. A further concept of the invention is using a drive voltage established on the light emitting unit, more specifically, the LED on voltage established on the LED when the LED is on, which LED on voltage is more stable, to power the relay. This neither needs a high-frequency compatible power converter to directly convert the ballast's high frequency output thus saves cost and complexity.

According to examples in accordance with an aspect of the invention, there is provided a lamp, comprising:

an input adapted to be connected to a high frequency ballast for gas discharge lamps;

a light emitting unit, comprising LED, for receiving power from the input and establishing a LED on voltage on the LED;

at least one isolation switch coupled between the input and the light emitting unit; and a power supply unit adapted to obtain power from the established LED on voltage and to use the power for powering the isolation switch to close the switch and thereby electrically connect the input to the light emitting unit, wherein the lamp is configured to:

be unable to establish a voltage amplitude sufficient for the power supply unit to close the isolation switch when the high frequency ballast is in a preheat state; and establish the voltage amplitude sufficient for the power supply unit to close the isolation switch when the high frequency ballast is in a later state after the preheat state.

This lamp maintains an isolation switch open during the initial preheat state of the high frequency ballast and this meets the correct connection detection requirement of some high frequency ballasts. After that, only when a later phase, such as full ignition phase, is reached does the power supply unit close the isolation switch. Thus, the lamp is by default isolated from human touch. The closing of the isolation switch can only happen once the lamp is correctly connected to the fluorescent ballast.

The ON voltage of the light emitting unit may for example be used (directly or after down-conversion) to power the power supply unit. While this voltage is insufficient for the power supply unit to close the isolation switch, the light emitting unit remains isolated from the input. The lamp is designed such that the required voltage is not reached during the preheat stage. The ON voltage established on the light emitting unit is normally more stable and thus provides a good voltage supply for the relay.

The voltage used to power the power supply unit may be a tapped voltage from an intermediate location along the LED string, as long as the forward voltage is enough to power the power supply unit.

The isolation switch may be adapted to be open in the preheat state such that the lamp is adapted to be seen as a high impedance by the high frequency ballast to allow the high frequency ballast to start up.

The lamp may further comprise an output capacitor in parallel with the light emitting unit.

The output capacitor forms an energy storage component for buffering purposes, to reduce LED current ripple and also stabilize the voltage on LED. Thus, it also stabilizes the voltage to the power supply unit.

In an embodiment, the lamp comprises a detection circuit adapted to detect that the lamp is connected to the high frequency ballast; and a control circuit to enable the power supply unit when the detection circuit detects that the lamp is connected the high frequency ballast.

This embodiment ensures that the input is a high frequency input and avoids mis-activation of the power supply unit and the isolation switch when there is also LED on voltage in undesignated scenarios.

In a further embodiment, the lamp optionally has a further input to be connected with a low frequency power comprising at least one of AC mains and an electromagnetic ballast's output, the detection circuit optionally comprises a frequency detector to detect a frequency of an input to determine whether the lamp is connected to the high frequency ballast, and the control circuit optionally comprises a switch to couple the LED on voltage to the power supply unit when the detection circuit detects that the lamp is connected the high frequency ballast, otherwise to decouple the LED on voltage from the power supply unit.

In this embodiment, since the further input is adapted to receive low frequency power and drive the LED, it is only necessary to turn on the isolation switch to close the power path designed for the high frequency ballast when the lamp detects that it is really connected to the high frequency ballast. This avoid power consumption on the power supply unit when the lamp is connected to low frequency power. In a more specific implementation, the detection is via frequency detection.

The current from the high frequency ballast to the light emitting unit in the preheat state may be in the range 10% to 20% of the nominal current in a normal driving state, which nominal current is in the range 100 mA to 1 A. The current during the preheat stage is thus typically tens of mA, and this current is normally too small to allow the light emitting unit to turn on and establish the sufficient voltage.

The later stage for example comprises an ignition state of the high frequency ballast, wherein an ignition current in the ignition state to the light emitting unit is in the range of 100% to 200% of the nominal current in a normal driving state, which ignition current is between 200 mA to 1 A, and the light emitting unit is able to be turned on and adapted to establish the voltage amplitude in a period of 1 ms to 20 ms.

The isolation switch is closed during the ignition state to allow powering the light emitting unit through a low impedance path.

The isolation switch is for example provided with a parallel bypass capacitor to allow the high frequency ignition current to flow before the isolation switch is closed.

Thus, the voltage on the lighting element can begin to rise, but not sufficiently during the preheat stage for the power supply unit to be activated.

The power supply unit for example comprises a switch mode power supply, and the isolation switch comprises a relay (or a set of relays). The switch mode power supply for example comprises a buck converter.

The switch mode power supply for example comprises an IC controller, to operate the switch mode power supply, which IC controller is activated by a voltage supply above a threshold voltage corresponding to the voltage amplitude, wherein the lamp further comprises a voltage divider for generating the voltage supply from the LED on voltage. Thus, the power supply for the IC is a scaled version of the LED on voltage established on the LED.

Alternatively, the power supply unit comprises a voltage dividing power supply or a direct power supply. Here voltage dividing power supply means there is an impedance component to take some of the LED on voltage and provide the remaining LED on voltage to drive the isolation switch. And the direct power supply means there is a direct electrical connection without substantially voltage dropping, so that the LED on voltage is substantially all used to drive the isolation switch. This provides simpler implementation for the power supply unit than the switch mode power supply implementation.

In one embodiment the voltage dividing power supply comprises a resistor voltage dividing circuit. Here the resistor can take the excessive voltage and provide enough remaining voltage to drive the isolation switch.

In another embodiment, the voltage dividing power supply comprises a capacitor-resistor voltage dividing circuit. Here the capacitor-resistor voltage dividing circuit is a parallel connection of a capacitor and a resistor. When the LED on voltage is established and the switch SW1 is close (by detecting that the lamp is connected to a high frequency ballast), the capacitor C1 intends to suppress the voltage built on itself, and this gives a larger portion of the LED on voltage to the coils to drive the isolation switch. This provides a strengthened actuation to close and keep close the isolation switch such as relay. As time goes by, the voltage on the capacitor increases, but the remaining and (though) decreased LED on voltage is still sufficient to keep the close state of the isolation switch. Such an initial boost on the driving voltage is very preferred by the relay, and the present embodiment implemented this by using a combination of the LED on voltage and the capacitor-resistor voltage dividing circuit.

The lamp may comprise a tubular LED lamp, wherein the light emitting unit comprises a LED arrangement, and the lamp comprises:

- a first pair of input terminals at one end and a second pair of input terminals at an opposite end; and
- a first isolation switch at the first pair of input terminals and a second isolation switch at the second pair of input terminals.

Thus, there is isolation at both ends of the lamp.

An isolation switch at each pair of input terminals may be provided with a respective parallel bypass capacitor as mentioned above, to allow the ignition current to flow before the isolation switch is closed.

The lamp may further comprise a rectifier arrangement between the input and the light emitting unit, which rectifier arrangement comprises a first bridge rectifier connected to the first pair of terminals through the first isolation switch and a second bridge rectifier connected to the second pair of input terminals through the second isolation switch.

The power supply unit may have a single output for controlling the first and second isolation switches. This provides a simple structure, with one relay control signal.

The lamp may comprise first and second filament emulation circuits, wherein, when the first and second isolation switches are open:

- the first filament emulation circuit is connected between the first pair of input terminals at one end of the lamp; and
- the second filament emulation circuit is connected between the second pair of input terminals at another end of the lamp.

The preheat current flows through the filament emulation circuits. A small current may also flow from an input terminal at one end to an input terminal at the opposite end. The ignition current instead flows between the ends of the lamp.

When the first and second isolation switches are closed, the first and second filament emulation circuits are preferably electrically floating. They then play no role in the functioning of the lamp.

The invention also provides a lighting fixture comprising:

- an electronic fluorescent lighting ballast for gas discharge lamps; and
- a lamp as define above fitted to the fluorescent lighting ballast.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
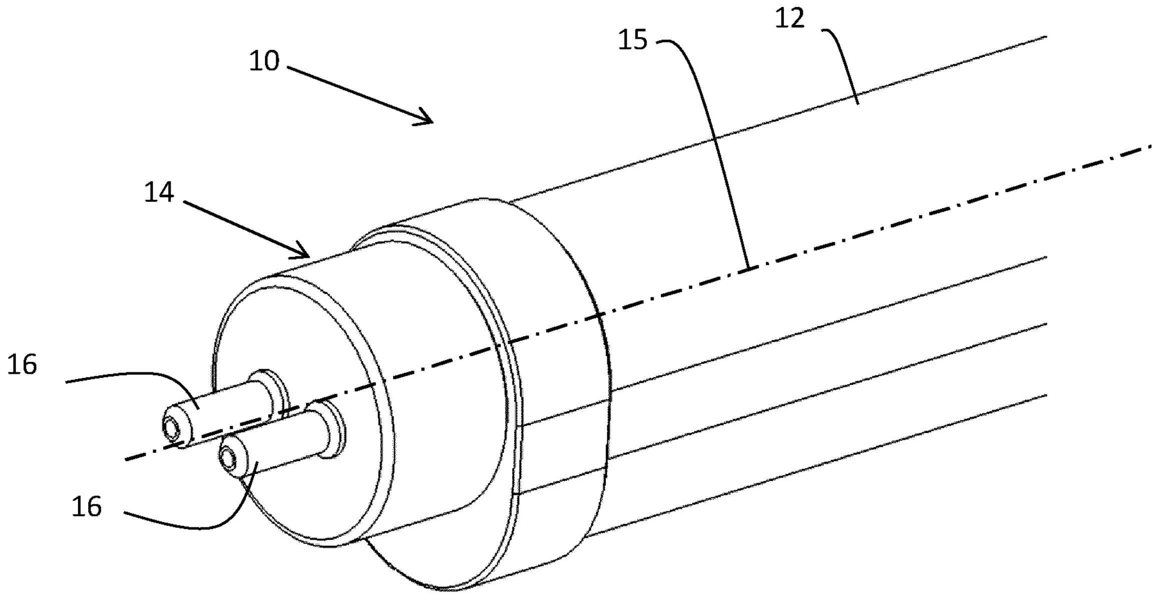
FIG. 1 shows a basic known tubular LED lamp.
Figure 2:
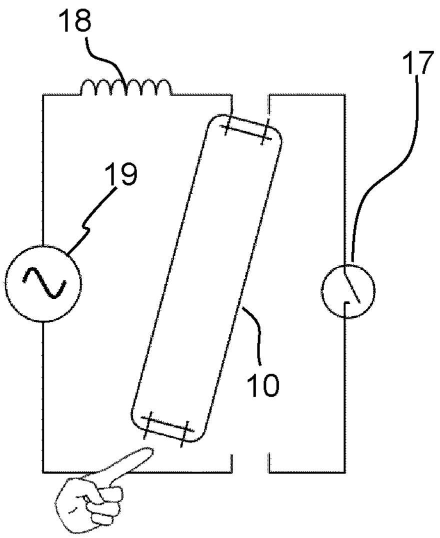
FIG. 2 shows an example of an electromagnetic ballast.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lamp which comprises an input for connection to a high frequency ballast for gas discharge lamps. A power supply unit obtains power from a LED on voltage of the light emitting unit of the lamp, and the power supply unit powers an isolation switch at the input. During a preheat state of the ballast, the power supply unit does not close the isolation switch, but the isolation switch is closed when the high frequency ballast is in a later state, i.e. the ignition phase. The selection is done automatically by whether a sufficient voltage is established on the light emitting unit, in the different preheat and later states.

The invention relates in particular to a lamp in which an electric pin safety solution making use of an isolation switch such as a relay is adopted to enable a tubular LED to be used with a high frequency fluorescent tube ballast.

Conventionally, such a relay is driven by a circuit of discrete components, resulting in a complex circuit which is difficult to place in the limited space of the PCB of a TLED, especially for a T5 tube.

A low drop out, LDO, circuit can instead be used as the supply for a relay, but the circuit efficiency is poor which risks excessive heat generation, and there are compatibility issues with some ballasts such as dimming ballasts. The LDO circuit uses a MOSFET operating in the linear mode, and thus has high power loss at a high bus voltage (Vbus) condition.

The invention is based on the use of a switch mode power supply circuit, including a switch mode power supply IC, as a relay control circuit. This provides a solution suitable for the limited PCB space of TLED lamp. It also enables a high efficiency, and thus better lumen output, without a risk of overheating.

Figure 3:
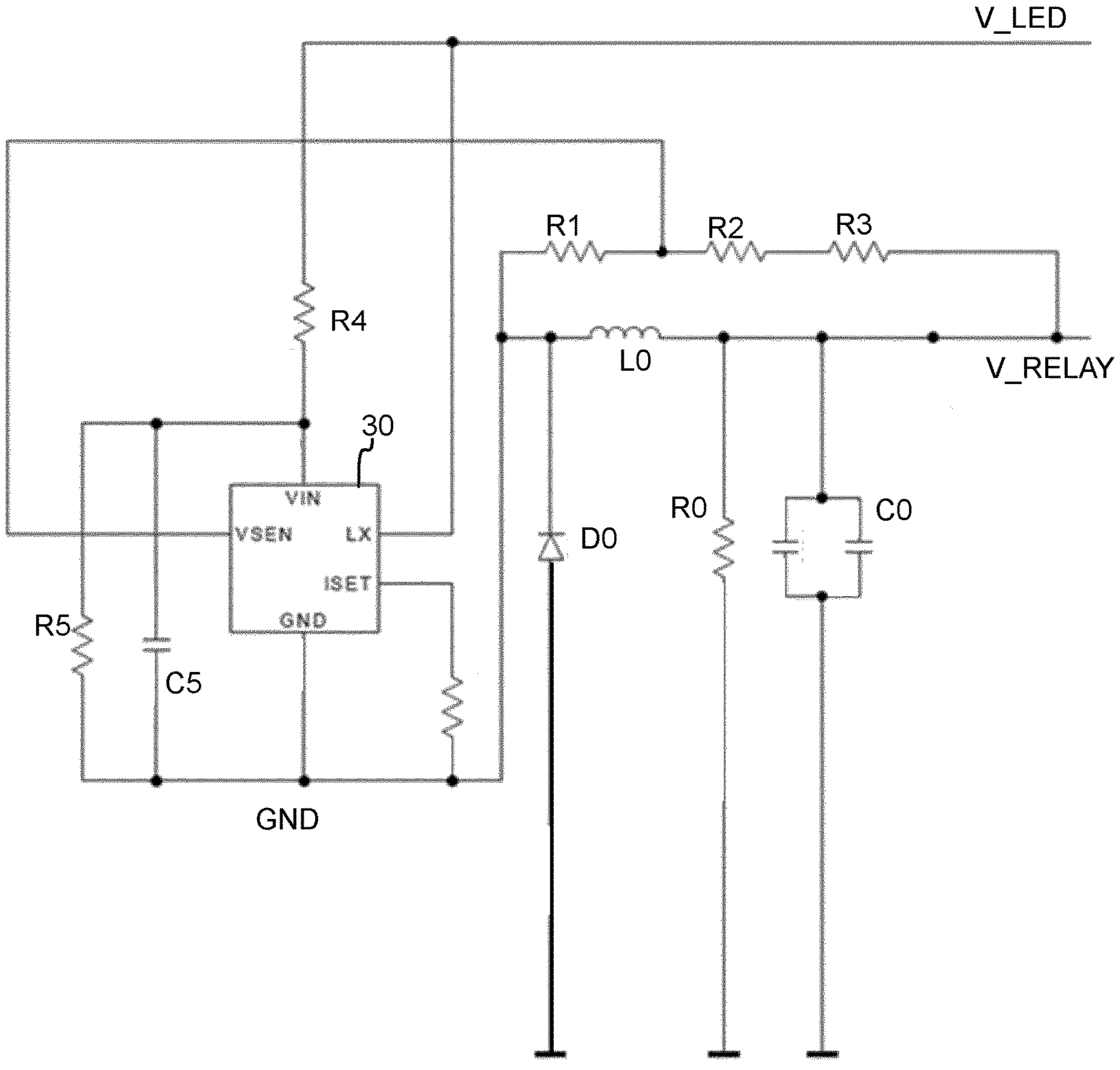
FIG. 3 shows a relate control circuit based on a switch mode power supply.

FIG. 3 shows a relay control circuit based on the pulse switch modulating IC controller 30 of a switch mode power supply. The IC controller 30 is for example a buck converter including a main converter switch and feedback control circuitry.

The IC controller has a sense terminal VSEN for receiving a feedback control voltage, and the circuit controls the switching of the main converter switch (which is integrated in the controller IC 30) to regulate the feedback voltage.

The buck converter circuit comprises inductor L0, diode D0, and load in the form of resistor R0 and capacitor C0.

The relay control voltage V_RELAY is the output voltage of the converter.

The feedback voltage for the sense terminal is obtained by resistor divider R1, R2, R3 between the output V_RELAY out and the ground terminal of the IC controller.

The IC controller has a ground terminal GND, a supply terminal VIN, a voltage sense input VSEN, a current setting input ISET and a terminal LX which connects to the drain of the main switch (a high voltage MOSFET).

The controller IC 30 is supplied by a voltage to terminal VIN based on a resistive divider R4, R5 between the voltage V_LED and ground, GND. Note that the voltage supplied to the controller IC may instead be a tapped voltage an intermediate location along the LED string, as long as the forward voltage is enough to power the power supply. The voltage divider R4, R5 in the example shown determines when V_LED is sufficient to turn on the IC. The capacitor C5 buffers the result of the divider to remove jitter or spikes.

The input to the buck converter is V_LED. The current flows in via terminal LX, and flows out via ISET and to the inductor L0. The feedback control implemented by the controller IC is for providing voltage regulation of the output voltage V_RELAY. The current setting input ISET is used for setting a current limit.

The lamp current of the ballast between the two ends of a TLED (shown in FIG. 4) is very small during the preheat stage. Typically, it will last for less than 2 seconds. The current is about 10%-20% of the normal operation current. The normal operating current is for example several hundred mA. The current during the preheat stage is not enough to build sufficient voltage across the LEDs (on the storage capacitors C7, C8 shown in FIG. 4) to turn on the LEDs. Thus the LED voltage V_LED is very small.

Some intelligent ballasts will detect the circuit impedance during the preheat stage, and if the lamp impedance is too low, the ballast cannot start up normally. If an isolation relay is off, the circuit will have a high impedance, and this assists in ballast detection and operation.

The controller IC also typically implements an under voltage protection voltage (Vuvp). This can be set based on the equation below:

$$Vuvp=(R4+R5)/R5*VIN\_on$$

VIN_on is the voltage at which the IC turns on.

Vuvp can for example be set to around 80% of the normal LED string voltage. When the voltage across the capacitor C5 is less then Vuvp, the IC 30 stops working and the relay will be switched off (i.e. the relay will be open).

The circuit is for example designed such that the LED string voltage is less than 50% of the normal LED string voltage during the preheat stage. As a result, the IC stops. The lamp will start operating when the capacitor C5 is charged to VIN_on, and this takes place during the ballast ignition phase.

Thus, during the preheat stage, the voltage V_LED only reaches for example 50% of the normal LED string voltage and hence does not reach Vuvp and the voltage VIN does not reach VIN_on.

Figure 4:
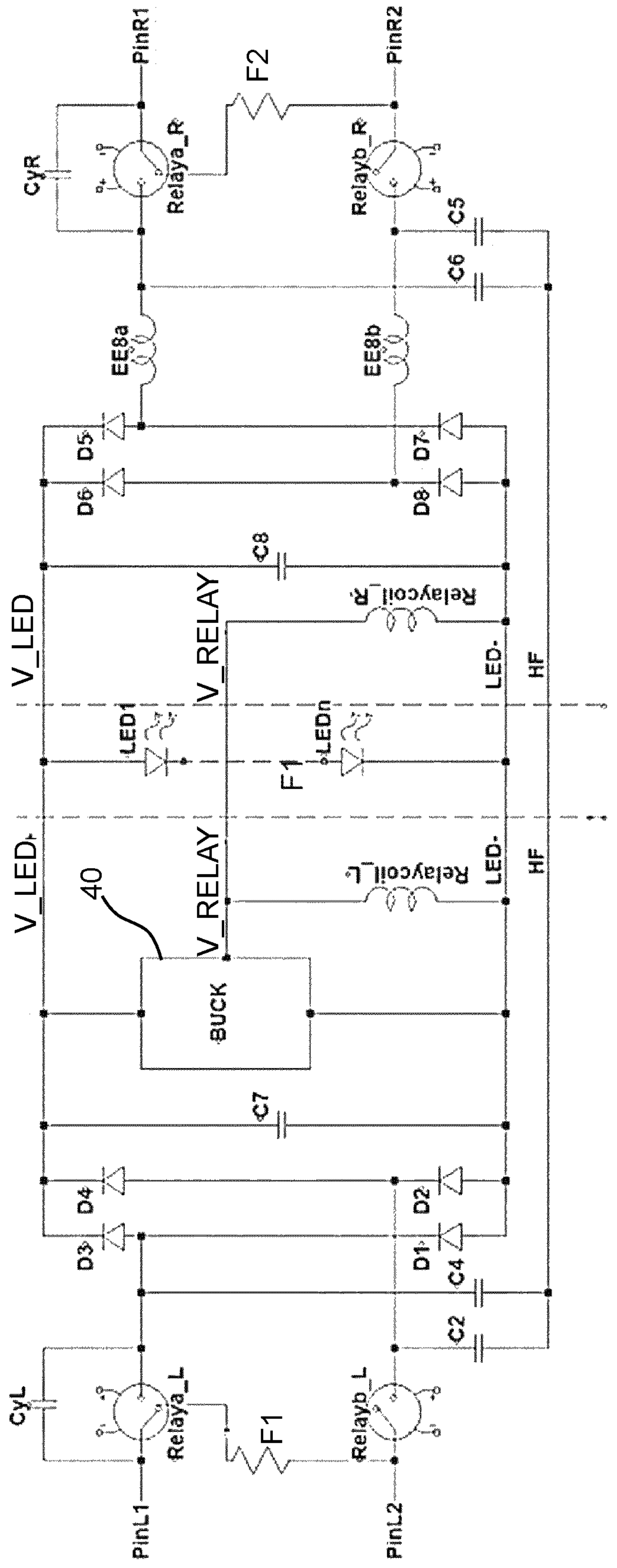
FIG. 4 shows a lighting circuit.

The voltage reached by V_LED depends on the current delivered, as a result of the charging of capacitor capacitors C7, C8 (in FIG. 4). Thus, the circuit is designed based on the known current flow during the preheat stage and the known duration (or range of durations for different types of ballast) of the preheat stage, such that the divided voltage VIN_on is not reached during the preheat stage.

By way of example only, VIN_on=15V, R5=50 kΩ, R4=250 kΩ. In this case, Vuvp=90V, V_LED (nominal)=120V (so Vuvp is approximately 80% of V_LED).

During the preheat stage, V_LED reaches 50% of the nominal LED string voltage, i.e. 60V, so Vuvp is not reached by V_LED and VIN_on is not reached at VIN (VIN is at about 10V).

During ignition, V_LED rises quickly. When it passes 90V, the IC 30 turns on, and the isolation switches close.

The setting of Vuvp to around 80% of the nominal value of V_LED (rather than a lower value as would conventionally be the case) is so that the IC 30 will not mis-trigger during the preheat stage, and the IC will be triggered by the under voltage protection only during the normal operating condition.

FIG. 4 shows a lighting circuit in accordance with the invention.

The lighting circuit is integrated within a tubular lamp of the type shown in FIG. 1. The tubular lamp has a first (left) end with external connectors PinL1 and PinL2 and a second (right) end with external connectors PinR1 and PinR2. Each external connector defines an input adapted to be connected to a high frequency ballast for gas discharge lamps.

Each pin is connected in series with a respective electrical isolation switch in the form of a relay. The relay Relaya_L is at pin PinL1, the relay Relayb_L is at pin PinL2, the relay Relaya_R is at pin PinR1 and the relay Relayb_L is at pin PinR2.

The relay Relaya_L at one pin at one end has a parallel Y-capacitor CyL, and the relay Relaya_R at the corresponding pin at the other end also has a parallel Y-capacitor CyR.

These capacitors provide a high frequency conduction path when the isolation switches are turned off.

Each end of the TLED lamp has a filament emulation circuit. The first end has a filament emulation circuit F1, in the form of a resistor, which is connected between the pins at the first end when the isolation switches are open. Similarly, the second end has a filament emulation circuit F2, in the form of a resistor, which is connected between the pins at the second end when the isolation switches are open. The filament emulation circuits F1 and F2 are only used for lamp detection at preheat stage. The real load seen by the ballast is the LED loading at normal operation (after ignition).

The pair of pins at each end connects to a full bridge diode rectifier with a buffer capacitor at the output. A first rectifier D1 to D4 and buffer capacitor C7 is at the first (left) end and a second rectifier D5 to D8 and buffer capacitor C8 is at the second (right) end.

At the first end, the output of the rectifier D1 to D4 defines the LED voltage V_LED. This is the LED on voltage across a light emitting unit, in the form of LEDs LED1 to LEDn. There may be a series circuit of LEDs or a combination of series and a parallel LEDs. This LED on voltage provides the supply voltage to the buck converter 40. The buck converter is one example of possible power supply unit which obtains power from the established LED on voltage and uses the power to control the isolation switches. Closing the isolation switches electrically connects the respective input to the light emitting unit.

At the second end, the external terminals connect to the rectifier D5 to D8 through coils EE8*a* and EE8*b*. These are matching inductors for adjusting LED current when connected to different ballasts.

The output of the rectifier D5 to D8 also defines the LED voltage V_LED.

The buck converter 40 comprises all of the parts shown in FIG. 3. Thus, the supply voltage is converted by a resistive divider before being supplied to the controller IC 30 of the buck converter 40.

The output voltage V_RELAY drives two relay coils Relaycoil_L and Relaycoil_R. One coil drives the pair of relays in synchronism at one end, and the other coil drives the pair of relays in synchronism at the other end.

The isolation switches (relays) are turned off (i.e. the switches are open) during the preheat stage of the ballast, and they are turned on at the ignition stage. During the preheat stage, the current from the high frequency ballast to the light emitting unit in the preheat state is for example in the range 10% to 20% of the nominal current in a normal driving state. The nominal current is for example in the range 100 mA to 1 A so the current to the light emitting unit during the preheat stage is thus tens of mA. This small current will flow between PinL1 and PinR1. During the preheat stage a current typically of several hundred mA will flow through the filament emulation circuits F1 and F2.

The capacitors CyL and CyR are in series with the LED string. The circuit thus has a high impedance, which is beneficial for correct operation of the ballast.

The small current of tens of mA is unable to establish a voltage amplitude on the buffer capacitors C7, C8 and the LEDs sufficient for the power supply unit 40 to turn on and thereby close the isolation switches.

After the preheat stage, the ballast delivers the ignition current. During the preheat stage, most of the current flows from one pin to the other pin at the same terminal (e.g. PinL1 to PinL2, and PinR1 to PinR2). The ignition current instead flows between the two ends (intended for ionizing the gas in a gas lamp). This current flows through part of the diode bridge at one end, through the LED arrangement and through part of the diode bridge at the other end.

This ignition current is sufficient that the voltage amplitude sufficient for the power supply unit 40 to be powered is reached. The isolation switches are then closed. The first and second filament emulation circuits are then electrically floating. They then play no role in the normal functioning of the lamp.

Thus, only when the ignition phase is reached does the power supply close the isolation switches. Thus, the lamp is safe to touch until the preheat stage is complete.

More practically, during the ignition state of the high frequency ballast, an ignition current in delivered to the light emitting unit is in the range of 100% to 200% of the nominal current in a normal driving state. The ignition current is for example between 200 mA and 1 A.

The light emitting unit is then able to establish the voltage amplitude to turn on the power supply unit 40 in a period of 1 ms to 20 ms.

The capacitors C2, C4, C5 and C6 are matching capacitors, used to adjust the LED current when connected to different ballasts.

Figure 5A:
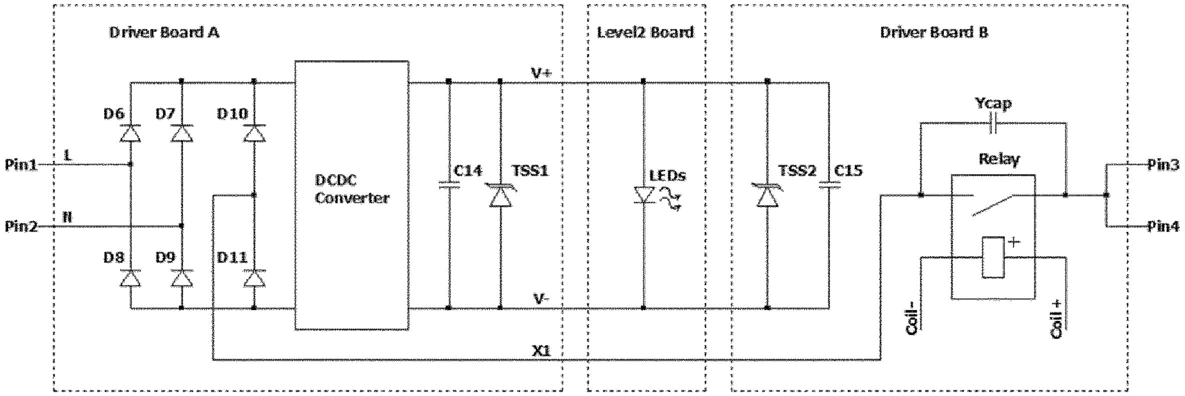
FIGS. 5A and 5B show another lighting circuit.
Figure 5B:
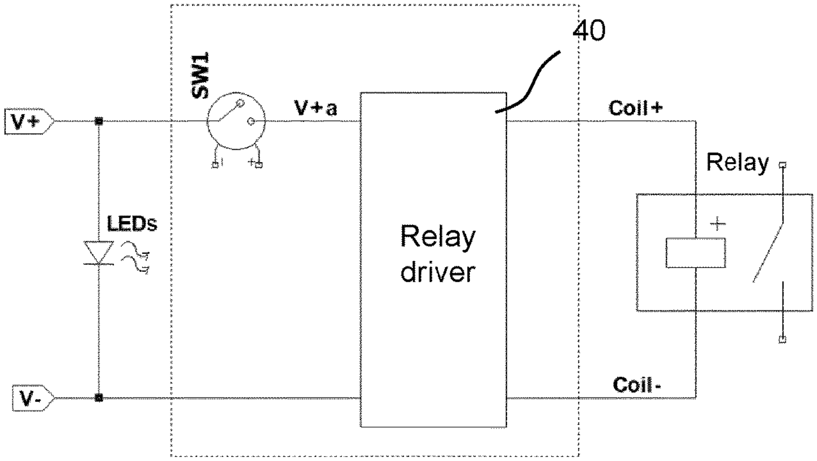

FIGS. 5A and 5B shows a circuit diagram of another LED tube lamp using the concept of the invention. The additional capability of the LED tube in FIG. 5A is that it can support AC mains input or electromagnetic ballast input between pin1 and pin2 at the left end. For AC mains input or electromagnetic ballast input, the energy come into the rectifier formed by diodes D6, D7, D8 and D9 and to a DCDC converter to power the LEDs. Besides, it can support high frequency ballast input between the left end to right end similar as described above. For high frequency ballast input, pin1 and pin2 are the same voltage, and pin3 and pin4 are the same voltage, the energy first comes in via the Ycap and the diodes, and turn on the LED, the LED on voltage between the V+ and V− then powers the relay driver to turn on the relay and bypass the Ycap, similar as described above.

The inventors realizes that, the relay does not need to be driven in case of AC mains input or electromagnetic ballast input. However, since the relay driver obtains the LED on voltage to drive the relay, the relay driver would still be powered when the LED is turned on by the AC mains input or electromagnetic ballast input. This results in wasted power. Moreover, in the hi-pot test, an AC frequency high voltage is applied between the left end and the right end, this high voltage may go through the Ycap and also turn on the LED. In this case the LED on voltage will power the relay driver and close the relay, the closed relay results a low impedance path for the hi-pot test voltage, and the hi-pot test would fail. The inventors also want to avoid this problem.

To solve at least these two problems, the inventors proposes that the relay driver is powered by the LED on voltage only when the input to the LED tube lamp is a high frequency ballast, excluding the case of low frequency AC mains or electromagnetic ballast input, or low frequency hi-pot test voltage. There is a detection circuit to detect the presence of a high frequency ballast, more specifically, the detection circuit could be a frequency detector to detect a high frequency signal of the input. The implementation of a frequency detector to recognize the high frequency and filter out the low frequency is well known for those skilled in the art, such as a high pass filter. And as shown in FIG. 5B, there is a switch SW1 to close to couple the LED on voltage to the power supply unit/relay driver 40 when the detection circuit detects that the lamp is connected the high frequency ballast, otherwise to the switch SW1 is open and decouple the LED on voltage from the power supply unit/relay driver 40. The switch SW1 could be implemented by a MOSFET, a bi-polar transistor, or even a relay. The output of the detection circuit may be converted properly to drive the switch SW1, and the driving of a switch is also a quite common implementation for those skilled in the art. The description will not give further details.

Instead of implementing the power supply unit by switch mode power supply, we can implement it by a voltage dividing or even a direct power supply.

Figure 6A:
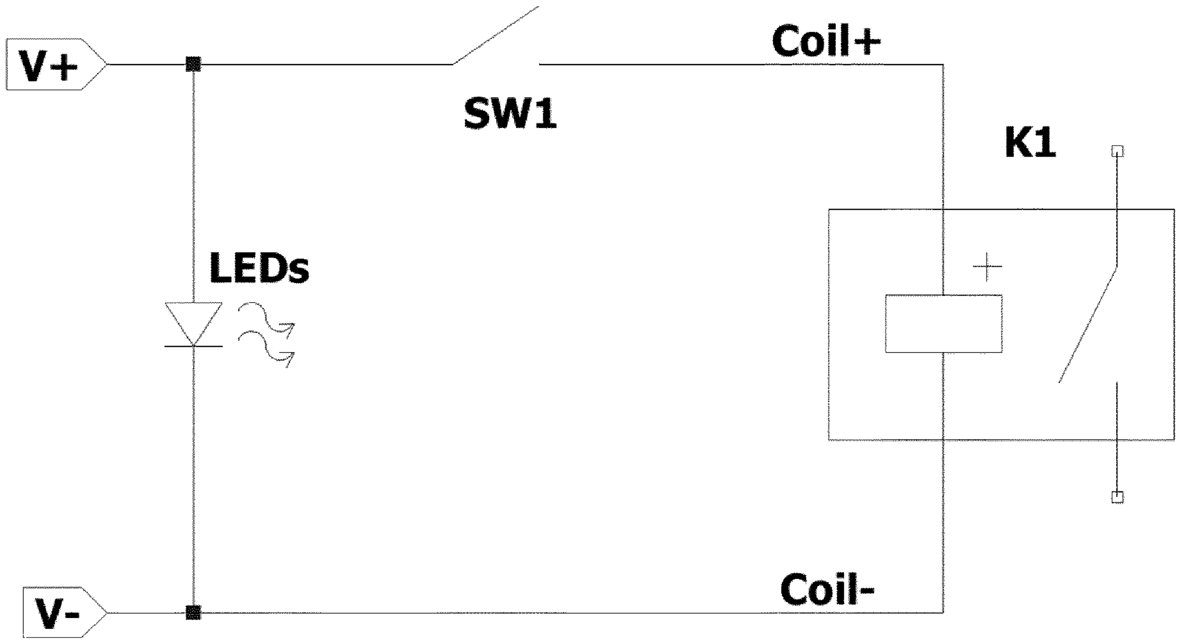
FIGS. 6A to 6C shows other implementations for the power supply unit.

The direct power supply means there is a direct electrical connection without substantially voltage dropping, so that the LED on voltage is substantially all used to drive the isolation switch. This provides simpler implementation for the power supply unit than the switch mode power supply implementation. FIG. 6A shows this implementation.

Figure 6B:
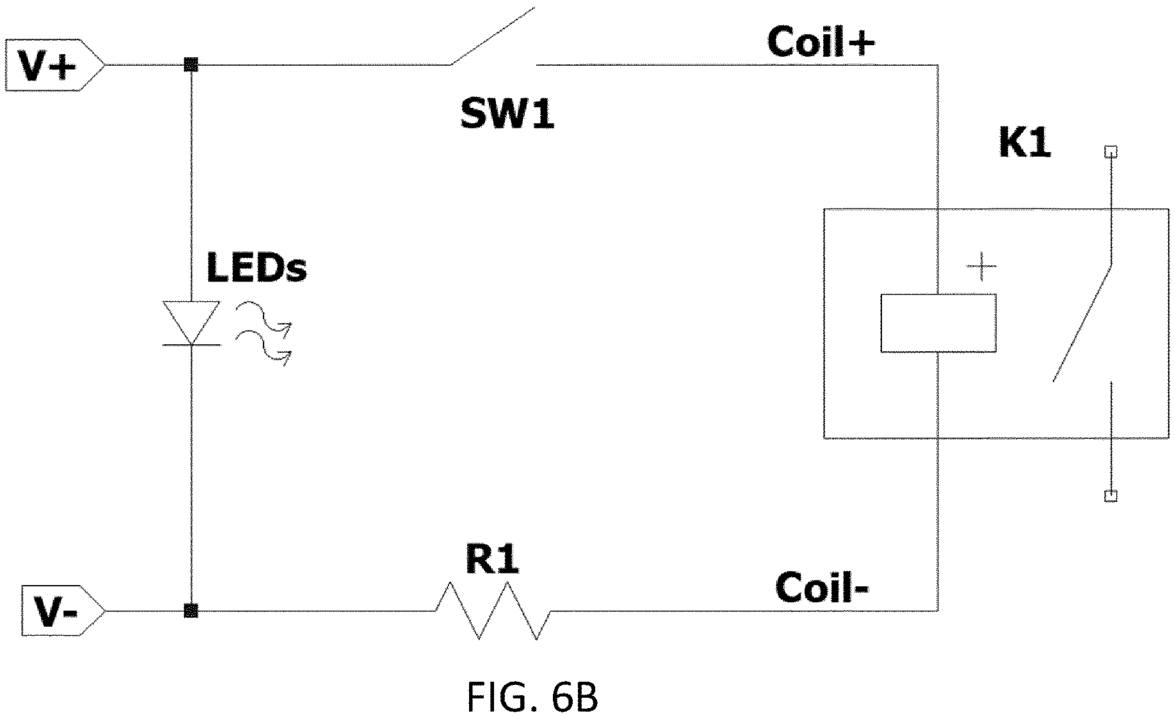

The voltage dividing power supply means there is an impedance component to take some voltage and provide the remaining LED on voltage to drive the isolation switch. As shown in FIG. 6B, we can select one or more LEDs whose ON voltages sum is higher than the drive voltage. One resistor R1 is used to take some portion of the LED ON voltage and leave the remaining portion of the LED on voltage to drive the isolation switch. The voltage dividing power supply has better efficiency.

Figure 6C:
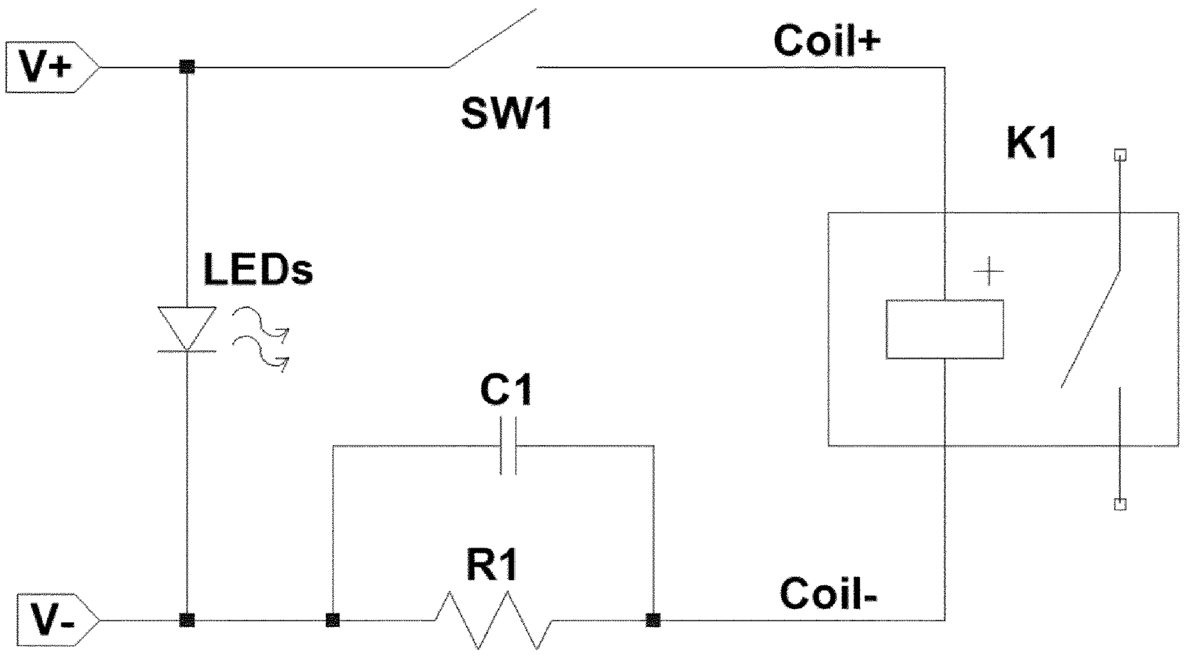

In further improved solution, a capacitor-resistor voltage dividing circuit is used, as shown in FIG. 6C. Capacitor-resistor voltage dividing circuit means a parallel connection of a capacitor and a resistor. The capacitor, since it intends to suppress the voltage built on it, gives a larger portion of the LED on voltage to drive the isolation switch. This provides a strengthened actuation to close the isolation switch such as relay. As time goes by, the voltage on the capacitor increases, the remaining portion of LED on voltage, being taken by the isolation switch, is sufficient to keep the close state of the isolation switch. Thus the efficiency is also high.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A lamp, comprising:

an input adapted to be connected to a high frequency ballast for gas discharge lamps;

a light emitting unit, comprising LEDs, for receiving power from the input and establishing a LED on voltage across the LEDs when the LEDs are on;

at least one isolation switch coupled between the input and the light emitting unit; and a power supply unit adapted to obtain power from the established LED on voltage and to use the power for powering the at least one isolation switch to close the switch and thereby electrically connect the input to the light emitting unit, wherein the lamp is configured to:

be unable to establish the LED on voltage sufficient for the power supply unit to close the at least one isolation switch when the high frequency ballast is in a preheat state; and establish the LED on voltage sufficient for the power supply unit to close the at least one isolation switch when the high frequency ballast is in a later state after the preheat state.

2. The lamp of claim 1, wherein the at least one isolation switch is adapted to be open in the preheat state such that the lamp is adapted to be seen as a high impedance by the high frequency ballast to allow the high frequency ballast to start up, and further comprising an output capacitor in parallel with the light emitting unit.

3. The lamp of claim 1, further comprising:

a detection circuit adapted to detect that the lamp is connected to the high frequency ballast; and a control circuit to enable the power supply unit when the detection circuit detects that the lamp is connected the high frequency ballast;

wherein the lamp optionally has a further input to be connected with a low frequency power comprising at least one of AC mains and an electromagnetic ballast's output, the detection circuit optionally comprises a frequency detector to detect a frequency of an input to determine whether the lamp is connected to the high frequency ballast, and the control circuit optionally comprises a switch to couple the LED on voltage to the power supply unit when the detection circuit detects that the lamp is connected the high frequency ballast, otherwise to decouple the LED on voltage from the power supply unit.

4. The lamp of claim 1, wherein the current from the high frequency ballast to the light emitting unit in the preheat state is in the range 10% to 20% of the nominal current in a normal driving state, which nominal current is in the range 100 mA to 1 A.

5. The lamp of claim 1, wherein the later stage comprises an ignition state of the high frequency ballast, wherein an ignition current in the ignition state to the light emitting unit is in the range of 100% to 200% of the nominal current in a normal driving state, which ignition current is between 200 mA to 1 A, and the light emitting unit is adapted to establish the sufficient LED on voltage in a period of 1 ms to 20 ms.

6. The lamp of claim 5, wherein the at least one isolation switch is provided with a parallel bypass capacitor to allow a high frequency ignition current to flow before the at least one isolation switch is closed.

7. The lamp of claim 1, wherein the power supply unit comprises a switch mode power supply or alternatively a voltage-dividing power supply or a direct power supply, wherein said voltage-dividing power supply comprises a resistor voltage dividing circuit or a capacitor-resistor voltage dividing circuit, and the at least one isolation switch comprises at least one relay.

8. The lamp of claim 7, wherein when the power supply unit comprises the switch mode power supply, the switch mode power supply comprises an IC controller, to operate the switch mode power supply, which IC controller is activated by a voltage supply above a threshold voltage corresponding to the sufficient LED on voltage, wherein the lamp further comprises a voltage divider for generating the voltage supply from the LED on voltage.

9. The lamp of claim 5, comprising a tubular LED lamp, and the lamp comprises:

a first pair of input terminals of the input at one end and a second pair of input terminals of the input at an opposite end; and a first isolation switch of the at least one isolation switch at the first pair of input terminals and a second isolation switch of the at least one isolation switch at the second pair of input terminals.

10. The lamp of claim 9, wherein one of the at least one isolation switch at each pair of input terminals is provided with a respective parallel bypass capacitor to allow the ignition current, which is high frequency, to flow before the one isolation switch is closed.

11. The lamp of claim 9, further comprising a rectifier arrangement between the input and the light emitting unit, which rectifier arrangement comprises a first bridge rectifier connected to the first pair of terminals through the first isolation switch and a second bridge rectifier connected to the second pair of input terminals through the second isolation switch.

12. The lamp of claim 9, wherein the power supply unit has a single output for controlling the first and second isolation switches.

13. The lamp of claim 9, comprising first and second filament emulation circuits, wherein, when the first and second isolation switches are open:

the first filament emulation circuit is connected between the first pair of input terminals at one end of the lamp; and the second filament emulation circuit is connected between the second pair of input terminals at another end of the lamp.

14. The lamp of claim 13, wherein when the first and second isolation switches are closed the first and second filament emulation circuits are electrically floating.

15. A lighting fixture comprising:

an electronic fluorescent lighting ballast for gas discharge lamps; and a lamp as claimed in claim 1 fitted to the fluorescent lighting ballast.

* * * * *